US007289441B1

(12) United States Patent  (10) Patent No.: US 7,289,441 B1
Barach  (45) Date of Patent: Oct. 30, 2007

(54) FLEXIBLE WAN PROTOCOL CALL ADMISSION CONTROL ALGORITHM

(75) Inventor: David Richard Barach, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 1080 days.

(21) Appl. No.: 10/200,653

(22) Filed: Jul. 22, 2002

(51) Int. Cl.
 *H04L 12/16* (2006.01)
(52) U.S. Cl. .................................. 370/230; 370/231
(58) Field of Classification Search ................ 370/230, 370/231
 See application file for complete search history.

(56) References Cited

U.S. PATENT DOCUMENTS

| 6,430,156 | B1* | 8/2002 | Park et al. .................. 370/232 |
| 6,683,852 | B2* | 1/2004 | Nagarajan et al. .......... 370/235 |
| 6,697,329 | B1* | 2/2004 | McAllister et al. ......... 370/235 |
| 2006/0274650 | A1* | 12/2006 | Tyagi et al. ................ 370/229 |

OTHER PUBLICATIONS

C Rigney et al., Remote Authentication Dial In User Service (RADIUS), Daydreamer, RFC 2865, Jun. 2000, http://www.cis.ohio-state.edu/cgi-bin/rfc/rfc2865.html.
W. Townsley et al., Layer Two Tunneling Protocol "L2TP", Redback Networks, RFC 2661, Aug. 1999, http://www.cis.ohio-state.edu/cgi-bin/rfc/rfc2661.html.
L. Mamakos et al, A Method for Transmitting PPP Over Ethernet (PPPoE), RouterWare, Inc., RFC 2516, Feb. 1999, http://www.cis.ohio-state.edu/cgi-bin/rfc/rfc2516.html.
W. Simpson, Editor, The Point-to-Point Protocol (PPP), Daydreamer, RFC 1661, Jul. 1994, http://www.cis.ohio-state.edu/cgi-bin/rfc/rfc1661.html.

\* cited by examiner

*Primary Examiner*—Melvin Marcelo
(74) *Attorney, Agent, or Firm*—Cesari and McKenna LLP

(57) ABSTRACT

An intermediate network node is configured to drop or reject new client sessions when its available resources are below a predetermined level. In this manner, the intermediate node can efficiently process a large number of new session attempts at substantially the same time. The intermediate node monitors the availability of its resources by calculating a load metric. The load metric is based on one or more partial load metrics, each corresponding to a different system resource. The load metric is compared with a predetermined value to determine whether the node has enough available resources to continue establishing new client sessions. Alternatively, the intermediate node rejects new client sessions when a total number of allocated "abstract resource units" rises above a predetermined level. That is, client sessions are assigned a predetermined number of abstract resource units on a per-protocol basis and a resource counter stores the number of abstract resource units allocated by the intermediate node. Each protocol is assigned a different time interval for a timing wheel, after which time the number of abstract resource units assigned for the protocol is subtracted from the resource counter. The intermediate node actively or passively rejects new client sessions until the timing wheel sufficiently decreases the counter below the predetermined level.

33 Claims, 8 Drawing Sheets

FLEXIBLE WAN PROTOCOL CALL ADMISSION CONTROL ALGORITHM

FIELD OF THE INVENTION

This invention relates generally to an intermediate network node such as a router, and, more specifically, to call admission control algorithms that may be implemented in the intermediate network node.

BACKGROUND OF THE INVENTION

A computer network is a geographically distributed collection of interconnected subnetworks for transporting data between nodes, such as computers. A local area network (LAN) is an example of such a subnetwork; a plurality of LANs may be further interconnected by an intermediate network node, such as a router or switch, to extend the effective "size" of the computer network and increase the number of communicating nodes. The nodes typically communicate by exchanging discrete frames or packets of data according to predefined protocols. In this context, a protocol consists of a set of rules defining how the nodes interact with each other.

A communication session may be established between a source node and a destination node, each interconnected to an intermediate node by, e.g., a point-to-point link, shared LAN, wide area network (WAN) or virtual private network (VPN) implemented over a public network such as the Internet. Broadly stated, the session undergoes three distinct phases: session establishment, data transfer and session termination. During session establishment, the source node generally contacts a protocol-specific interface of the intermediate node, and the intermediate node establishes a protocol-specific path or "virtual circuit" between the source and destination nodes. For example, a source node connected to the intermediate node by a point-to-point link may initiate a Point-to-Point Protocol (PPP) session with a destination node. Once the connection has been established, data is transferred sequentially over the established path. When the session is no longer needed, the path is terminated.

One or more authentication processes are often implemented at session establishment time. For instance, an intermediate node may not permit the creation of a new PPP session unless a third party authentication service, such as a Remote Authentication Dial-in User Service (RADIUS), authenticates the source and/or destination nodes using, e.g., a Challenge Handshake Authentication Protocol (CHAP). The intermediate node may also rely on other authentication, authorization and accounting services of the RADIUS server when determining whether to accept or reject a new session. The operations of a RADIUS server are more fully described in RFC 2865 entitled *Remote Authentication Dial In User Service (RADIUS)*, which is hereby incorporated by reference as though fully set forth herein.

In general, to initiate a new session, a source node first sends one or more protocol data units (PDU) to an interface of the intermediate node. The PDUs may include, inter alia, control parameters for the session, such as a network address of a destination node, a frame encapsulation format, the source node's authentication information, etc. The intermediate node then configures the communication session in accordance with these control parameters. More specifically, depending on the type of session protocol, i.e., Point-to-Point Protocol over Ethernet (PPPoE) or Layer-2 Tunnel Protocol (L2TP), the intermediate node may process different PDU formats and contact one or more third party services, such as RADIUS.

For example, a source node attempting to establish a PPPoE session first sends an intermediate node an "initiation" PDU, commonly known as a PPPoE Active Discovery Initiation (PADI). Upon receiving the PADI, the intermediate node sets up the PPPoE session by participating in a multi-step PDU exchange that may involve receiving an additional PPPoE Active Discovery Request (PADR) packet from the source node, as described more fully in RFC 2516 entitled *A Method for Transmitting PPP over Ethernet (PPPoE)*, which is hereby incorporated by reference as though fully set forth herein. In contrast, a source node establishing an L2TP session initially sends the intermediate node a PDU having a different format, conventionally known as an Incoming Call Request (ICRQ). In this case, the intermediate node is engaged in a different PDU message exchange process, as described in more detail in RFC 2661 entitled *Layer Two Tunneling Protocol "L2TP,"* which is also hereby incorporated by reference as though fully set forth herein.

An intermediate node, i.e., a switch or router, may service tens of thousands of communication sessions at once. Typically, in "steady-state" operation, not every session is actively exchanging information at the same time, so the node's resources, such as central processing unit (CPU) bandwidth and available memory, are not overly consumed by the sessions. However, in the event of a temporary network outage to the intermediate node, such as a power outage or "line flap," the tens of thousands of sessions will typically be simultaneously disconnected. Consequently, the intermediate node may not have the available resources to re-establish all the disconnected sessions at substantially the same time.

For example, to reestablish sessions requiring RADIUS authentication, the intermediate node may have to buffer one or more PDUs, i.e., RADIUS, PADI, PADR and ICRQ packets, until the RADIUS server confirms or rejects authentication of a source and/or destination node. Thus, when the intermediate node is "flooded" by new session establishment attempts, the node may not have sufficient memory resources to store all the received PDUs while waiting for corresponding RADIUS server responses. Furthermore, in this situation, the CPU bandwidth of the intermediate node may not be sufficient to simultaneously process the thousands of received PDUs.

Previously, when an intermediate node receives more session establishment requests than its resources can manage, the node still attempts to establish a session for each received PDU. Clearly, this can result in excessive session establishment latencies if not outright session count oscillation. Further, additional delays may be created by a third party authentication service, such as RADIUS, that participates in the session establishment procedure. That is, even if the intermediate node has the resources to establish all the new sessions, the third party service may not. Thus, because an intermediate node or third party service may experience excessive delays while setting up a plurality of sessions, source nodes may "timeout" while waiting for a response to its initial PDU, i.e., a PADI or ICRQ packet, and may subsequently reattempt to establish the session after a predetermined time interval. In this manner, some source nodes timeout and send new PDUs even while the intermediate node continues to consume resources processing their previously sent PDUs.

The present invention is directed toward implementing call admission control (CAC) at a network node, such as an intermediate node. As used herein, call admission is the process of establishing communication sessions between network nodes. Accordingly, while previous CAC techniques allowed a plurality of new session establishment attempts to rate-limit themselves, i.e., by allowing source nodes to continually timeout and retry until their session is established, the invention implements a call admission technique that more efficiently utilizes a network node's resources, thereby decreasing its latency of establishing a large number of new communication sessions.

SUMMARY OF THE INVENTION

An intermediate network node embodying the invention is configured to drop or reject new client sessions when its available resources are below a predetermined level. Specifically, the node may actively reject new client sessions or passively "ignore" session establishment attempts until more resources become available. In this manner, the intermediate node can efficiently process a large number of new session attempts, e.g., after a temporary line flap or other network failure, without consuming all its system resources. Consequently, the average latency of establishing new client sessions may be reduced, as compared to previous call admission techniques.

According to one embodiment of the invention, the intermediate node monitors the availability of its resources by calculating a load metric. The load metric is based on one or more partial load metrics, each corresponding to a different system resource. For example, a partial load metric corresponding to CPU usage may be derived from a conventional CPU monitoring process by the intermediate node's operating system. Similarly, a second partial load metric may be generated from the amount of available memory in one or more public buffer pools.

The partial load metrics may be mathematically combined to generate an overall load metric for the intermediate node. The resulting load metric is compared to a predetermined value to determine whether the node has enough available resources to continue establishing new client sessions. If the load metric is above the predetermined value, the intermediate node may actively or passively reject attempts to establish new sessions. Advantageously, the load metric and/or the predetermined value may be scaled or otherwise adjusted to reflect the different resource requirements for establishing sessions using different protocols, such as L2TP and PPPoE.

In an alternate embodiment, an intermediate node actively or passively rejects new client sessions when a total number of allocated "abstract resource units" rises above a predetermined level. That is, client sessions are assigned a predetermined number of abstract resource units on a per-protocol basis. For example, each L2TP session may be assigned a value of N abstract units, whereas each PPPoE session may be assigned a value of M units. According to the invention, a resource counter stores the number of abstract resource units allocated by the intermediate node. Thus, the counter is appropriately incremented every time a new client session is established with the node.

A timing wheel is implemented by the intermediate node to decrement the resource counter after a preset time interval elapses. Each protocol is assigned a different time interval for the timing wheel, after which time the number of abstract resource units assigned for the protocol is subtracted from the resource counter. For example, an L2TP session may be assigned N resource units and a preset time interval of T seconds. When a new L2TP session is established, the resource counter is incremented by N units, and after T seconds elapses, the counter is decremented by N units. In this way, each session of a protocol type is assigned a predetermined number of abstract data units that are stored in the resource counter for a preset period of time. When the value of the resource counter rise above a predetermined level, the intermediate node actively or passively rejects new client sessions until the timing wheel sufficiently decreases the counter.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

A. Intermediate Nodes in a Network

Figure 1:
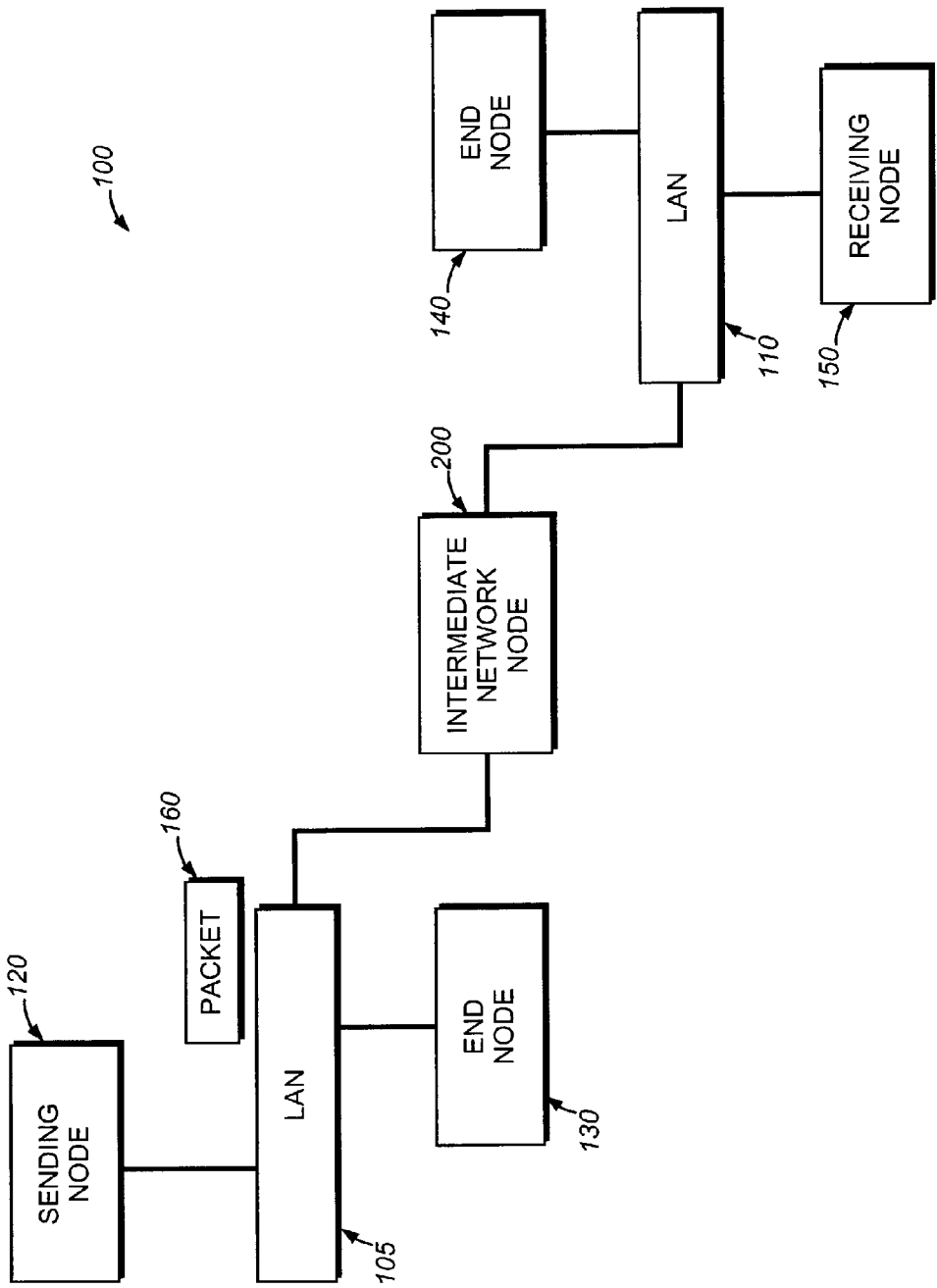
FIG. 1 is a schematic block diagram of a computer network comprising a collection of interconnected subnetworks and nodes, including an intermediate network node.

FIG. 1 is a block diagram of a computer network 100 comprising a collection of interconnected subnetworks and nodes. The nodes may comprise computers including end nodes 130 and 140, such as a sending end node 120 and a receiving end node 150, and an intermediate network node 200, the latter of which may be a switch or router. The subnetworks 105, 110 included within network 100 are preferably local area networks (LANs) interconnected by the intermediate node 200, although the networks may comprise other communication links, such as wide area networks. Communication among the nodes coupled to the LANs is typically effected by exchanging discrete packets 160 among the nodes.

For example, the sending node 120 generates a data packet 160 by encapsulating "payload" data within headers, such as conventional data link and network layer headers, as the data passes through different layers of a protocol stack. The packet is then transmitted over the network to the intermediate node 200 which facilitates the flow of the data packet through the network by routing it to the proper receiving node 150. Specifically, the node 200 receives the packet from an input port, parses the data link and network layer headers, renders a forwarding decision for the packet, appends a new data link header to the packet and then transmits the packet to an output port.

Figure 2:
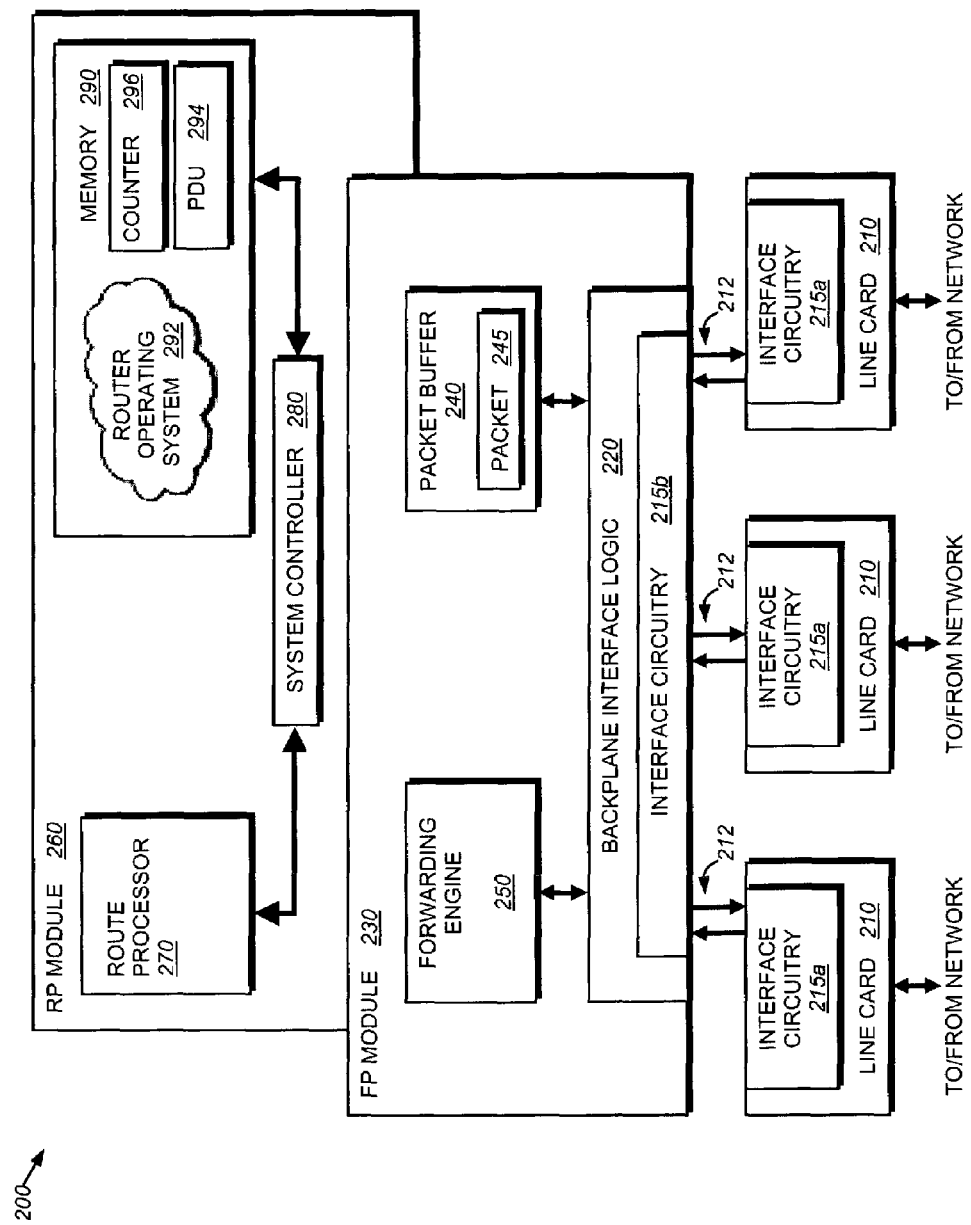
FIG. 2 is a schematic block diagram of an illustrative intermediate network node.

FIG. 2 is a schematic block diagram of an intermediate node 200 that may be advantageously used with the present invention. The node comprises a plurality of line cards 210, a forwarding processor (FP) module 230, and a route processor (RP) module 260. Data is received by the line cards, each of which is coupled to at least one network, such as LANs 105 and 110. More specifically, the line cards may be configured to transfer data to/from more than one type of network, including, inter alia, asynchronous transfer mode (ATM), synchronous optical networks (SONET), frame relay, Ethernet, Fiber Distributed Data Interface (FDDI), etc.

The line cards 210 are coupled to a backplane logic circuit 220 by a plurality of high-speed unidirectional (i.e., point-to-point) links 212. Preferably, the backplane logic circuit is embodied as a high performance application specific integrated circuit (ASIC) comprising an interface circuitry 215b coupled to the unidirectional links. Corresponding interface circuitry 215a, preferably embodied within a high performance ASIC resident on each of the line cards, couples the line cards to the unidirectional links. The interface circuitry generally converts conventional formats of data received at the line cards to a protocol format for transmission over the unidirectional links, and vice-versa.

Broadly stated, the functional infrastructure of the intermediate node is divided into a data plane and a control plane. The data plane includes components used to retrieve data packets from a network and, when necessary, provide a forwarding decision for those packets. To that end, the data plane extends from the line cards 210 to the unidirectional links 212, through the links to the backplane interface logic 220, and through the backplane to a forwarding engine 250 (such as an array of processors) in the FP module 230. The forwarding engine essentially comprises the forwarding path functionality of the intermediate node and may be implemented as microcoded hardware in the data plane. A packet buffer 240 may store data packets 245 while the forwarding engine processes their associated headers when determining where and when the packets should be forwarded. The processed headers are prepended to their respective data packets, and the resultant packets are transferred from the backplane to an appropriate line card and network.

The control plane, on the other hand, includes those entities used to manage/control operation of the intermediate node and, to that end, extends from the backplane interface logic 220 to a route processor 270 (such as a general purpose MIPS processor) on the RP module 260. Although not shown, a bus, such as a peripheral component interconnect (PCI) bus, couples the backplane logic on the FP module with a system controller 280 on the RP module. The route processor is configured to perform configuration management functions for the intermediate node, such as constructing and loading routing tables used by the FP module 230. The processor 270 also communicates with neighboring nodes to exchange protocol data units (PDU) used to construct the routing tables in accordance with conventional routing algorithms and may also exchange PDUs for implementing session establishment protocols, such as PPPoE and L2TP.

The route processor 270 is coupled to the system controller 280 and a memory 290. The memory may comprise synchronous dynamic random access memory (SDRAM) storage locations addressable by the route processor and system controller for storing PDUs 294, software programs, buffer pools, data structures, etc. For example, the memory may comprise a counter 296 that stores a load metric or a value representing a number of allocated resource units, as will be discussed in regards to the present invention. A network routing operating system 292, portions of which are typically resident in the memory 290, is executed by the route processor for performing control/management operations. An example of a network routing operating system that may be advantageously used with the present invention is the Internetworking Operating System (IOS®) of Cisco Systems. It will be apparent to those skilled in the art that other memory means, including various computer readable media, may also be used for storing and executing program instructions pertaining to the operation of the intermediate node 200.

The present invention is directed toward implementing call admission control (CAC) in the control plane of a network node, such as the intermediate node 200. As used herein, call admission is the process of establishing communication sessions between network nodes. In operation, a source node sends the intermediate node a PDU for establishing a new communication session. The PDU may be received at an input port on one of the line cards 210 and forwarded to the backplane interface logic 220 via links to 212. Upon identifying the PDU as, e.g., a PADI or ICRQ packet, the backplane logic forwards the packet to the system controller 280 in the RP module. Typically, the controller directs the packet to the memory 290 which is addressable by the route processor. That is, the PDU may be stored in an appropriate "buffer pool" accessible to the processor 270. Depending on the PDU's associated protocol, the route processor may generate a response PDU that is transferred through the backplane to an output port on one of the line cards and ultimately back to the source node.

B. Load-Based Approach

According to an illustrative embodiment of the invention, a network node, such as an intermediate node, monitors the availability of its resources by calculating a load metric. The load metric is based on one or more partial load metrics, each corresponding to a different system resource. The partial load metrics are mathematically combined to generate an overall load metric which can be compared against a predetermined value to determine whether the node has sufficient resources for, e.g., establishing new communications sessions. While it is expressly contemplated to generate the load metric based on any number of partial load metrics, FIGS. 3 and 4 illustrate two exemplary partial load metrics corresponding to the central processing unit (CPU) usage of a route processor and the memory usage of a representative buffer pool.

Figure 3:
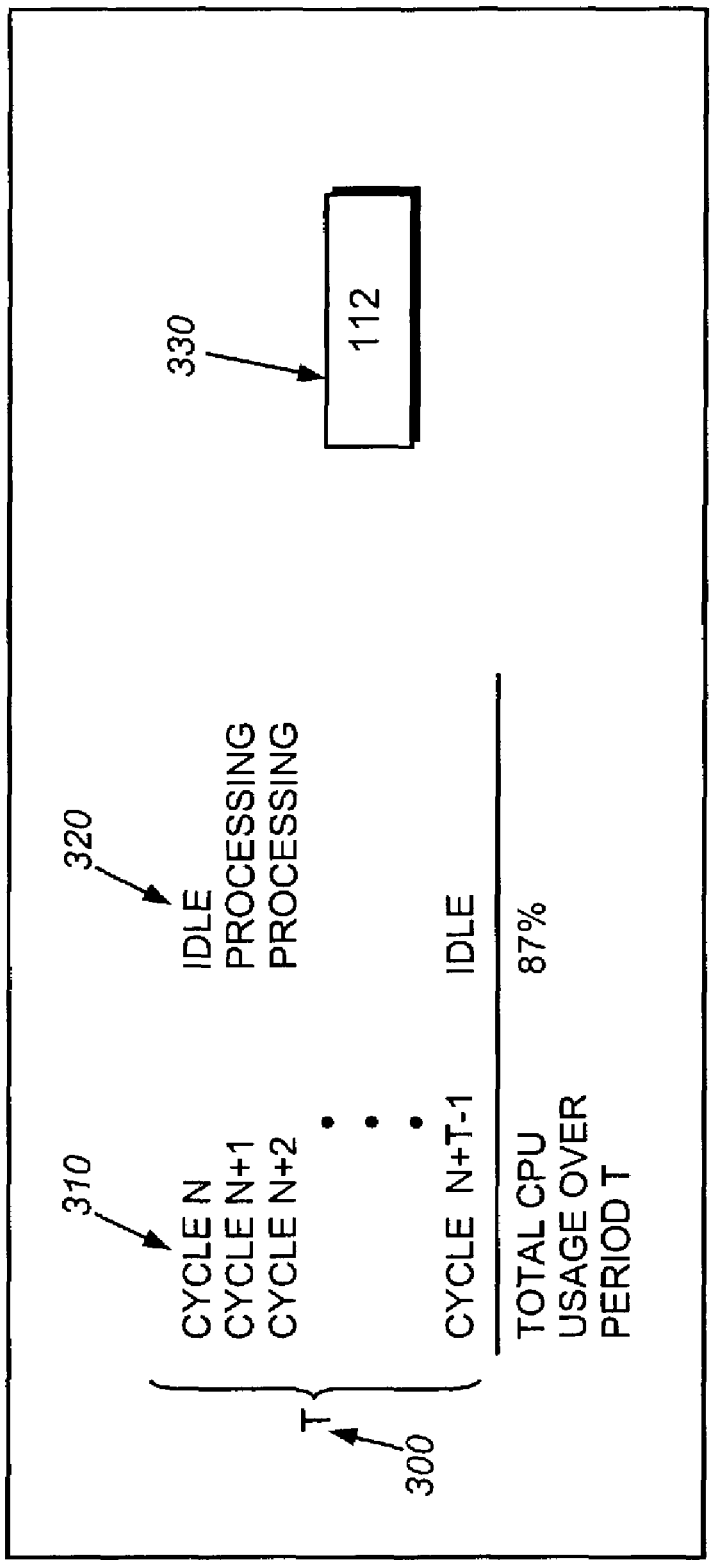
FIG. 3 is a table of an exemplary calculation of a CPU usage partial load metric, according to one embodiment of the invention.

As shown in FIG. 3, the CPU usage partial load metric may be calculated by determining how often a processor is idle (i.e., executing a "NOOP" instruction) or processing (not idle) over a predetermined number of clock cycles 300 (T). The predetermined number of clock cycles may correspond to a fixed time interval, such as 1 second. Put another way, the CPU usage may be periodically updated at a predetermined frequency, such as 1 hertz (Hz). For example, for every clock cycle 310 (or fixed multiple of clock cycles) within the predetermined number of clock cycles T, the router operating system 275 may record the state 320, i.e., idle or processing, of the route processor 270. The operating system may determine the state 320 based on whether it interrupts the CPU's program counter during an idle loop. Upon determining the CPU state, the operating system may increment an appropriate counter 330 located, e.g., in a designated register or location in memory 290, to indicate how many clock cycles the processor is in an idle state among the T clock cycles.

Once the predetermined number of clock cycles has completed, the operating system can quantify the route processor's usage 340 based on the value of the counter 330 and the number of elapsed clock cycles. The calculated CPU usage may be expressed as a percentage of the elapsed clock cycles (as shown), or may be represented using a non-linear scale, such as a log scale. Based on the CPU usage 340, a partial load metric may be determined. Accordingly, the CPU partial load metric may be a scaled or shifted version of the calculated CPU usage. Since the usage 340 is updated every T clock cycles, the CPU partial load metric may be periodically updated as well.

Figure 4:
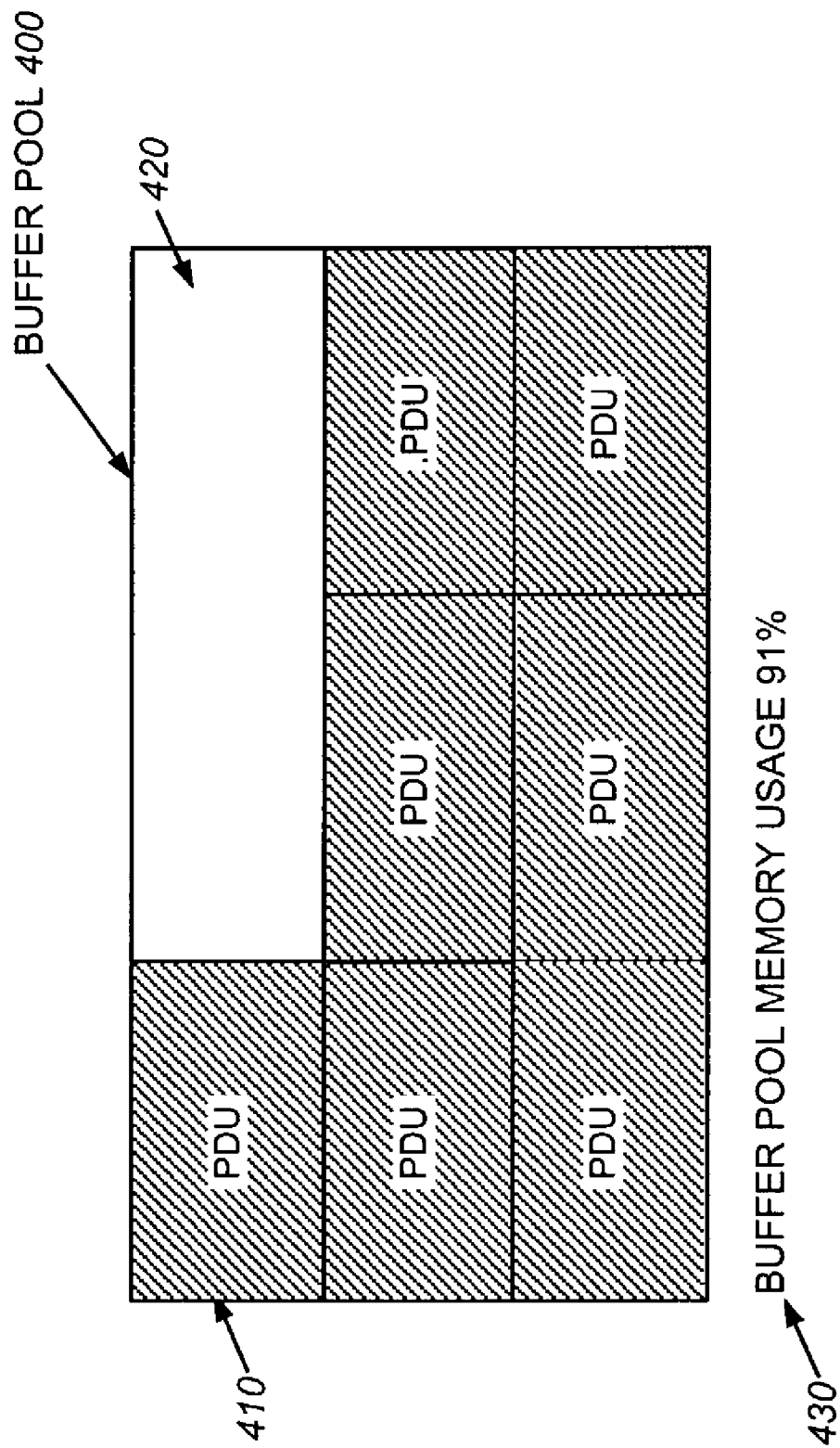
FIG. 4 is a schematic block diagram of a buffer pool used to calculate a memory usage partial load metric in accordance with the present invention.

FIG. 4 illustrates a representative buffer pool 400 that may be used to generate a memory usage partial load metric. The memory 290 may comprise, among other things, one or more buffer pools for storing received PDUs, such as PADI and ICRQ packets. Each pool is allocated a predetermined set of memory addresses in the memory 290. Typically, a plurality of buffer pools of differing sizes are used to store data entities, such as data structures and received packets, of comparable sizes. For example, a "small" sized buffer pool may store entities smaller than 104 bytes, a "medium" sized pool may store entities between 104 and 600 bytes, a "large" sized pool may store entities between 600 and 1524 bytes, and so on.

Each buffer pool may be associated with a measure of its memory usage. For instance, the memory allocated for the representative buffer pool 400 may comprise received PDUs 410 and one or more blocks of unused memory 420. The PDUs may be stored in the buffer pool while the network node awaits one or more responses from a third party service, such as RADIUS. Thus, the percentage 430 of the pool consumed by the PDUs may be calculated and stored, e.g., at a predetermined location in the memory 290. Based on the memory usage 430, a partial load metric for the pool may be determined. Accordingly, the memory usage partial load metric may be a scaled or shifted version of the calculated memory usage.

When there are multiple buffer pools resident in the memory 290, each pool may be associated with a respective partial load metric, or a single partial load metric may be generated based on the memory usages of all the pools. Advantageously, the router operating system 275 or the system controller 280 can update the buffer pools' memory usages as soon as an entity is added or removed from the pools, and the memory usage partial load metric can also be appropriately updated.

Because a plurality of partial load metrics may contribute to the generation of the overall load metric of the present invention, a load metric counter may be implemented to keep track of the number of partial load metrics utilized. The load metric counter and the partial load metrics can be mathematically combined to generate an overall load metric indicative of the resource consumption in a network node, such as an intermediate node. In an illustrative embodiment, the overall load metric (L) may be generated as an average of N individual partial load metrics ($P_1$), scaled by a constant C:

$$L = \frac{C}{N} \sum_{i=1}^{N} P_1 \tag{1}$$

or as a weighted ($W_i$) average of the N partial load metrics ($P_1$), scaled by a constant C:

$$L = \frac{C}{N} \sum_{i=1}^{N} W_i P_1 \tag{2}$$

Figure 5:
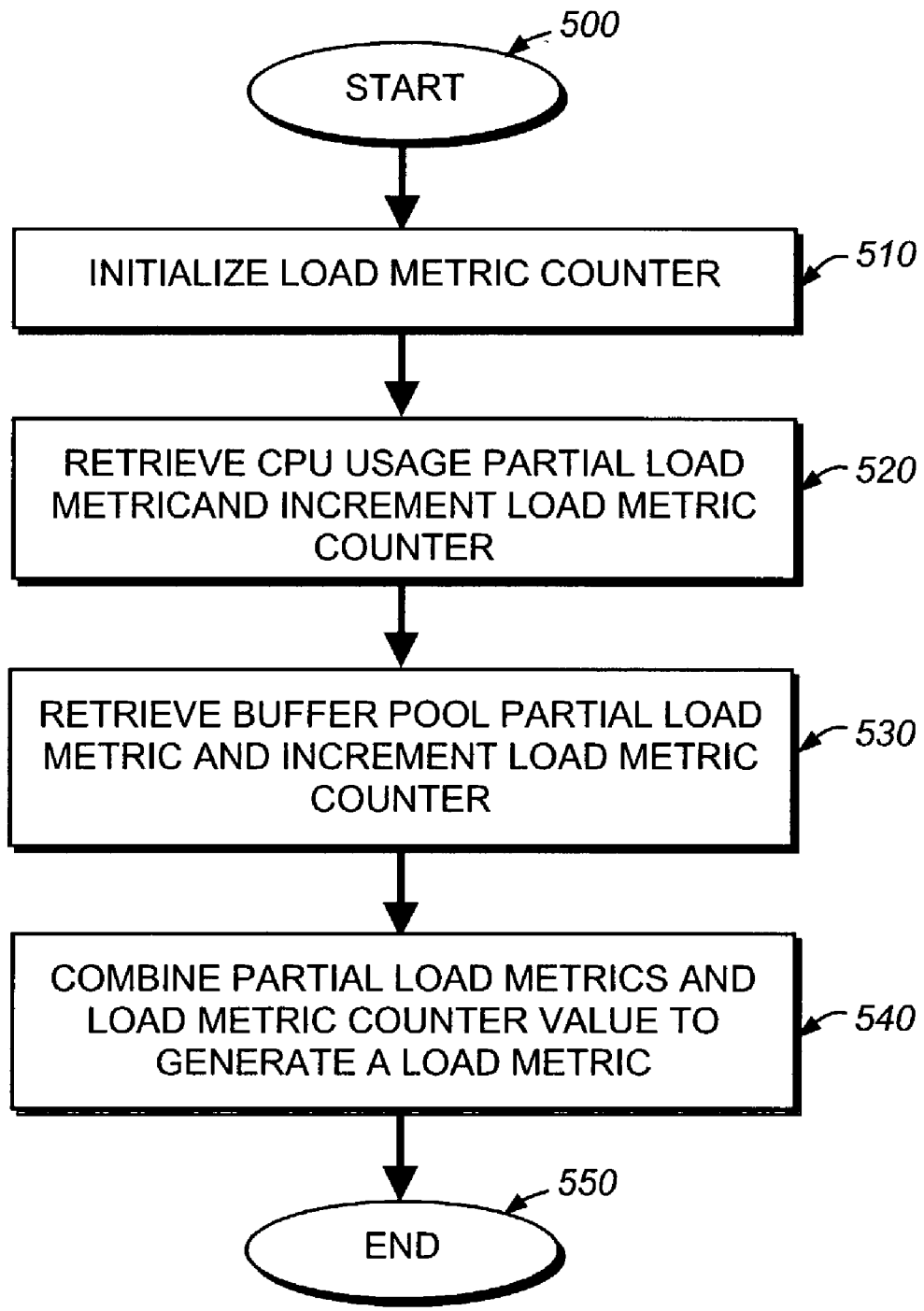
FIG. 5 is a flowchart illustrating a sequence of steps for combining the partial load metrics of the present invention to generate an overall load metric.

FIG. 5 illustrates a sequence of steps for a network node, such as an intermediate node, to calculate a load metric in accordance with the present invention. The sequence starts at step 500 and continues to step 510 where the load metric counter is initialized, i.e., set to zero (N=0). Next, at step 520, the last updated CPU usage partial metric is retrieved from the router operating system and the load metric counter is incremented by one (N=1). At step 530, the buffer pool partial load metric is retrieved from the operating system and the load metric counter is incremented by one (N=2). Clearly, other partial load metrics may be retrieved, if desired, each partial metric corresponding to a corresponding increase in the load metric counter. At step 540, the partial load metrics and the value of the load metric counter are mathematically combined, e.g. using equation (1) or (2) above, to generate an overall load metric representative of the node's resource consumption. The sequence ends at step 550.

Figure 6:
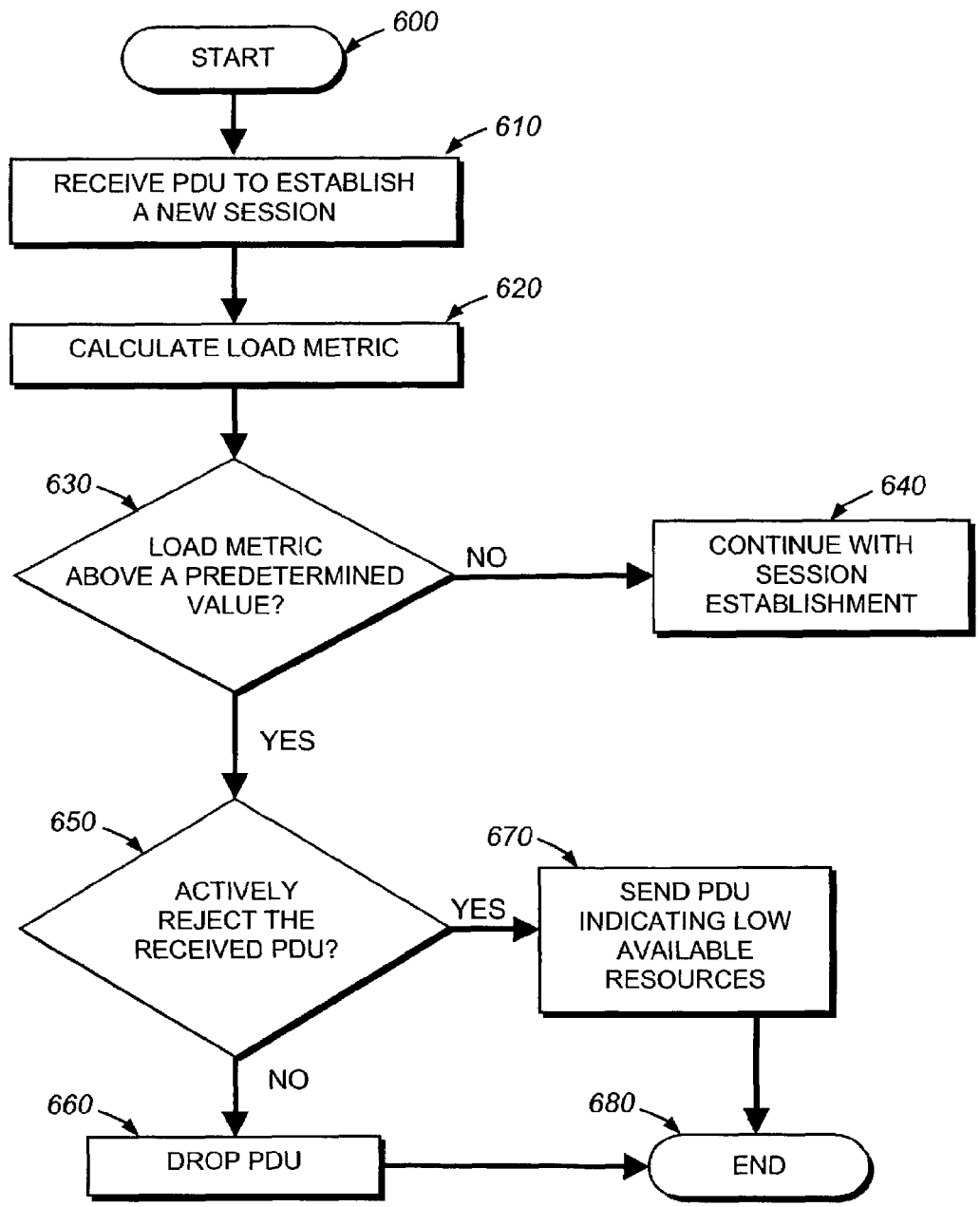
FIG. 6 is a flowchart illustrating a sequence of steps for implementing a load-based call admission control in accordance with the present invention.

FIG. 6 illustrates a sequence of steps for a novel call admission control (CAC) technique implemented by an intermediate node using a load metric generated as described by FIG. 5. The sequence starts at step 600 and continues to step 610 where a protocol data unit sent from a source node is received by a line card 210 of the intermediate node. The PDU may comprise information for implementing a session establishment protocol, such as PPPoE or L2TP. At step 620, the intermediate node calculates a load metric, according to the steps illustrated in FIG. 5. Alternatively, the load metric may be pre-computed and stored in a known location in, e.g., memory 290. The calculated load metric is compared with a predetermined value, at step 630, to determine whether the intermediate node has sufficient resources to establish a new session. If the load metric is less than the predetermined value, then, at step 640, the node continues with the session establishment protocol associated with the received PDU.

On the other hand, if the load metric is greater than the predetermined value, at step 650, the intermediate node determines whether to "actively" reject the received PDU by sending a response indicating it has low available resources or to "passively" reject the PDU by "dropping" it (i.e., ignoring receipt of the PDU). For example, if the PDU is a PADI or PADR, then the intermediate node may proceed to step 660 and passively reject the session establishment attempt by dropping the PDU. In contrast, if the PDU is an ICRQ, then the node may proceed to step 670 and actively reject the session by sending a call disconnect notify (CDN) message indicating it has low available resources (as per the L2TP protocol). In either case, active or passive rejection of the session establishment attempt, the sequence ends at step 680.

C. Timing Wheel Approach

In an alternate embodiment, call admission control is implemented at the intermediate node 200 by actively or passively rejecting new client sessions when a total number of allocated "abstract resource units" rises above a predetermined level. That is, client sessions are assigned a predetermined number of abstract resource units on a per-protocol basis. For example, each L2TP session may be assigned a value of N abstract units, whereas each PPPoE session may be assigned a value of M units. According to the invention, a resource counter stores the number of abstract resource units allocated by the intermediate node. Thus, the counter is appropriately incremented every time a new client session is established with the node.

A timing wheel is implemented by the intermediate node to decrement the resource counter after a preset time interval elapses. Each protocol is assigned a different time interval for the timing wheel, after which time the number of abstract resource units assigned for the protocol is subtracted from the resource counter. For example, an L2TP session may be assigned N resource units and a preset time interval of T seconds. Thus, when a new L2TP session is established, the resource counter is incremented by N units, and after T seconds elapses, the counter is decremented by N units. In this way, each session of a protocol type is assigned a predetermined number of abstract data units that are stored in the resource counter for a preset period of time.

Figure 7:
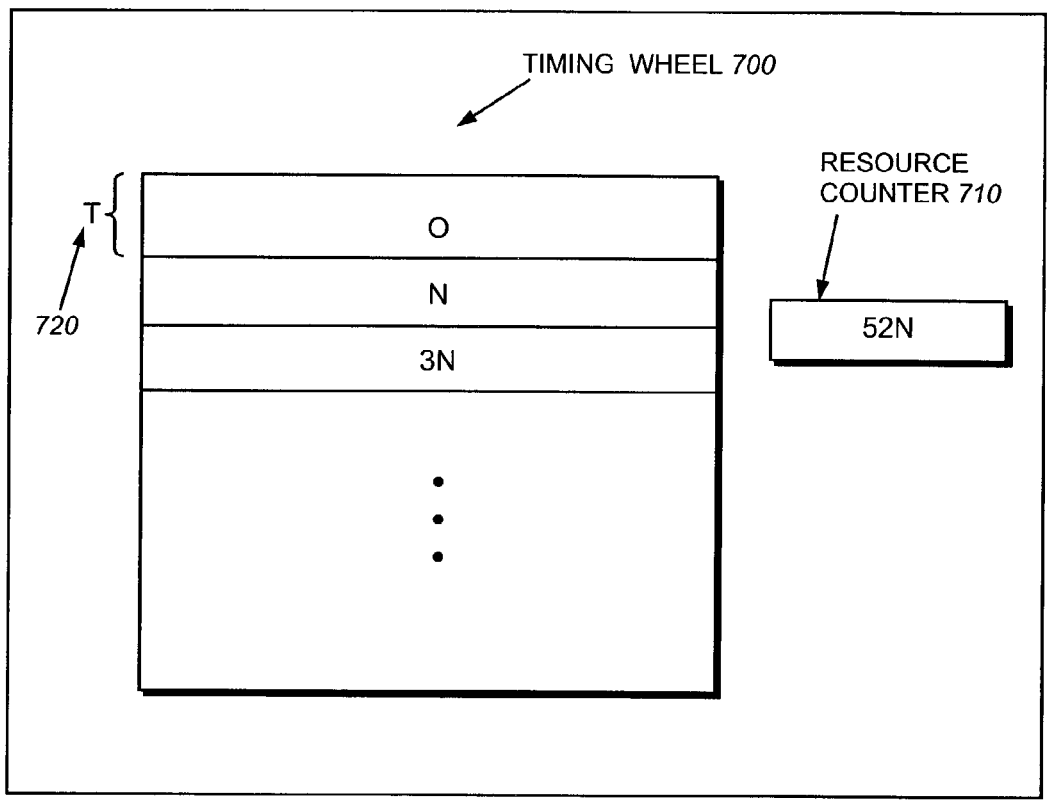
FIG. 7 is schematic block diagram of a timing wheel according to an embodiment of the invention.

FIG. 7 illustrates an exemplary timing wheel 700 and its associated resource counter 710 that may be implemented in accordance with the present invention. The timing wheel comprises a set of time slots, whereby an indicated time slot is removed from the set after a preset interval T (720). For every new session established by the intermediate node, a corresponding number of abstract resource units is allocated. More specifically, when a new session is established, the resource counter is incremented by the number of resource units assigned to the session protocol, and the same number of resource units are added to a slot of the timing wheel offset from the top of the timing wheel by the protocol's assigned interval.

For example, assume an L2TP session is assigned N units and a preset time interval of 2T. In this case, when a new L2TP session is established, the value N is added to the counter 710 and N is also added to the value stored in the second slot from the top of the timing wheel. It will be understood by those skilled in the art that all the slots of the timing wheel initially store zero resource units. Similarly, other protocols are assigned different numbers of abstract units and preset offsets. For each session establishment protocol, the corresponding number of abstract units and the preset time intervals may be determined by trial and error or other equivalent methods. Ideally, the preset time intervals adequately represent the amount of time required to establish a new session of the protocol type, and the number of resource units assigned to the protocol properly weights the timing wheel so as to minimize the average latency of establishing new communication sessions.

When a slot is removed from the wheel, the value stored in the slot is decremented from the resource counter. Thus, the value stored in the counter 710 is proportional to the number of sessions being simultaneously connected by the intermediate node. When the value of the resource counter rise above a predetermined level, the intermediate node actively or passively rejects new client sessions until the timing wheel sufficiently decreases the counter.

Figure 8:
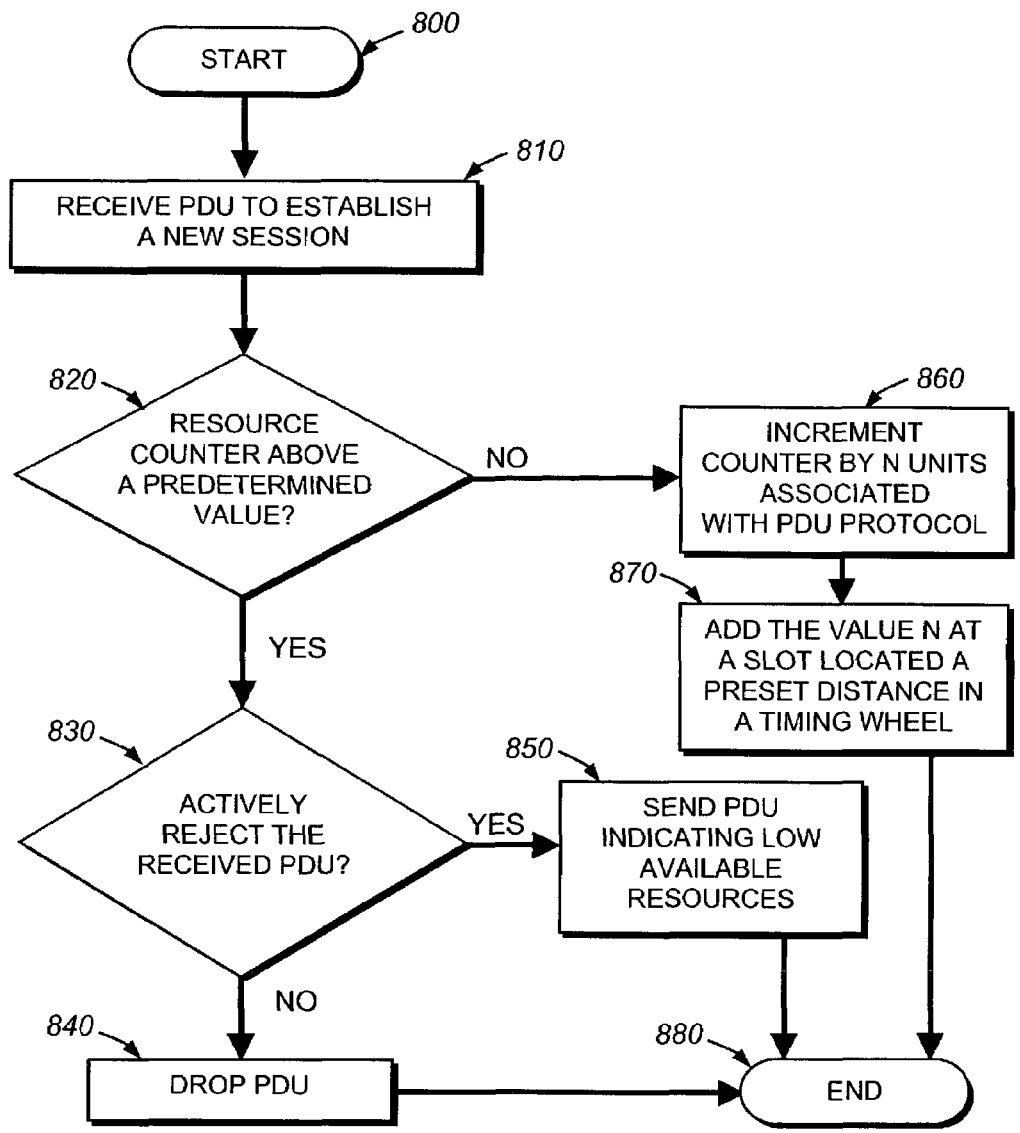
FIG. 8 is a flowchart illustrating a sequence of steps for implementing a timing wheel-based call admission control in accordance with the present invention.

FIG. 8 illustrates a sequence of steps for a novel call admission control (CAC) technique implemented by an intermediate node using the counter and timing wheel of FIG. 7. The sequence starts at step 800 and proceeds to step 810 where a protocol data unit sent from a source node is received by a line card 210 of the intermediate node. The PDU may comprise information for implementing a session establishment protocol, such as PPPoE or L2TP. At step 820, the current value of the resource counter 710 is compared to a predetermined value. As noted, the counter stores the number of abstract resource units that have been allocated by the intermediate node and have not been removed from the timing wheel 700.

If the number of allocated resource units is above the predetermined value, then, at step 830, the intermediate node determines whether to "actively" reject the received PDU by sending a response indicating it has low available resources or to "passively" reject the PDU by "dropping" it (i.e., ignoring receipt of the PDU). For example, if the PDU is a PADI or PADR, then the intermediate node may proceed to step 840 and passively reject the session establishment attempt by dropping the PDU. In contrast, if the PDU is an ICRQ, then the node may proceed to step 850 and actively reject the session by sending a call disconnect notify (CDN) message indicating it has low available resources (as per the L2TP protocol). In either case, active or passive rejection of the session establishment attempt, the sequence ends at step 880.

On the other hand, if the resource counter is below the predetermined value, then a new communication session may be established in accordance with the session establishment protocol associated with the received PDU. Specifically, at step 860, the resource counter may be incremented by N resource units associated with the PDU protocol. Next, at step 870, the value of N is added to the value stored in a slot of the timing wheel offset a preset distance, wherein the preset distance is determined based on the protocol type, i.e., PPPoE or L2TP. In this way, the session is connected as per the received PDU, and the sequence ends at step 880.

D. Conclusion

The foregoing has been a detailed description of an illustrative embodiment of the invention. Various modifications and additions can be made without departing from the spirit and scope of the invention. For example, other partial load metrics besides those explicitly disclosed herein may be used in the calculation of an overall load metric. Such partial load metrics may be based on available resources of a third party service, such as RADIUS, or the latencies of receiving responses from the third party service. Further, other resources of the network node, such as number of processes running in a local operating system, may additionally be used as a basis for one or more partial load metrics. Moreover, it is within the scope of the present invention to mathematically combine the partial load metrics in any manner that optimizes the network node's resource utilization when connecting a large number of new communication sessions at substantially the same time. Also, the overall load metric may be calculated periodically by a network node, or may be calculated on an "as needed" basis, such as when a new PDU is received.

While much of this description has been written in reference to CAC at an intermediate network node, the principles are equally pertinent to any network node, such as an L2TP access concentrator (LAC), L2TP Network Server (LNS), network access server (NAS), various end nodes, third party service (i.e., RADIUS, Kerberos, etc.), and so forth. In addition, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for implementing call admission control at an intermediate network node, the method comprising the steps of:
    receiving a protocol data unit (PDU) for a new communication session of a session establishment protocol;
    determining whether the intermediate node has a sufficient amount of resources available to establish the session, by calculating a partial load metric for one or more resources in the intermediate node, mathematically combining the calculated partial load metrics to generate an overall load metric, and comparing the generated load metric with a predetermined value; and
    rejecting the received PDU if the node has insufficient resources available.

2. The method according to claim 1, wherein the step of rejecting the received PDU includes the step of dropping the PDU.

3. The method according to claim 1, wherein the step of rejecting the received PDU includes the step of sending a second PDU indicating the intermediate node has low available resources.

4. A method for implementing call admission control at an intermediate network node, the method comprising the steps of:
    receiving a protocol data unit (PDU) for a new communication session of a session establishment protocol;
    determining whether the intermediate node has a sufficient amount of resources available to establish the session, by retrieving a value stored in a resource counter, and comparing the retrieved value with a predetermined value; and
    rejecting the received PDU if the node has insufficient resources available.

5. The method according to claim 4, wherein the resource counter stores a number of abstract resource units allocated by the intermediate node.

6. The method according to claim 5, wherein the resource counter is incremented when a new session is established with the intermediate node and is periodically decremented by an amount stored in an associated timing wheel.

7. The method according to claim 4, wherein the session establishment protocol is Point-to-Point Protocol over Ethernet (PPPoE).

8. The method according to claim 7, wherein the PDU is a PPPoE Active Discovery Initiation (PADI) packet.

9. The method according to claim 7, wherein the PDU is a PPPoE Active Discovery Request (PADR) packet.

10. A method for implementing call admission control at an intermediate network node, the method comprising the steps of:
    receiving a protocol data unit (PDU) for a new communication session of a session establishment protocol wherein the session establishment protocol is Layer-2 Tunnel Protocol (L2TP);
    determining whether the intermediate node has a sufficient amount of resources to establish the session; and
    rejecting the received PDU if the node has insufficient resources available.

11. The method according to claim 10, wherein the PDU is an Incoming Call Request (ICRQ) packet.

12. An intermediate network node that implements call admission control, the node comprising:
    means for receiving a protocol data units (PDU) for a new communication session of a particular session establishment protocol;
    means for determining whether the intermediate node has a sufficient amount of resources to establish the session, the means for determining including means for calculating a partial load metric for one or more resources in the intermediate node, means for mathematically combining the calculated partial load metrics to generate an overall load metric, and means for comparing the generated load metric with a predetermined value; and
    means for rejecting the received PDU if the node has insufficient resources available.

13. The intermediate network node according to claim 12, wherein the means for rejecting the received PDU further includes means for dropping the PDU.

14. The intermediate network node according to claim 12, wherein the means for rejecting the received PDU further includes means for sending a second PDU indicating the node has low available resources.

15. An intermediate network node that implements call admission control, the node comprising:
    means for receiving a protocol data units (PDU) for a new communication session of a particular session establishment protocol;
    means for determining whether the intermediate node has a sufficient amount of resources to establish the session, the means for determining including means for retrieving a value stored in a resource counter, and means for comparing the retrieved value with a predetermined value; and
    means for rejecting the received PDU if the node has insufficient resources available.

16. The intermediate network node according to claim 15, the node further comprising:
    means for incrementing the resource counter when a new session is established; and
    means for periodically decrementing the resource counter by an amount stored in an associated timing wheel.

17. A computer-readable media including instructions for execution by a processor the instructions for a method of implementing call admission control at an intermediate network node, the method comprising the steps of:
    receiving a PDU for a new communication session of a particular session establishment protocol;
    determining whether the intermediate node has a sufficient amount of resources to establish the session by calculating a partial load metric for one or more resources in the intermediate node, mathematically combining the calculated partial load metrics to generate an overall load metric, and comparing the generated load metric with a predetermined value; and
    rejecting the received PDU if the node has insufficient resources available.

18. A computer-readable media including instructions for execution by a processor, the instructions for:
    receiving a protocol data unit (PDU) for a new communication session of a session establishment protocol;
    determining whether a network node has a sufficient amount of resources available by retrieving a value stored in a resource counter, and comparing the retrieved value with a predetermined value; and rejecting the received PDU if the node has insufficient resources available.

19. The computer-readable media according to claim 18, wherein the step of rejecting the received PDU includes the step of dropping the PDU.

20. The computer-readable media according to claim 18, wherein the step of rejecting the received PDU includes the step of sending a second PDU indicating the intermediate node has low available resources.

21. An intermediate network node that implements call admission control, the node comprising:
a network interface configured to receive one or more protocol data units (PDUs) associated with a session establishment protocol;
a memory configured to store the one or more PDUs received at the network interface; and
a processor configured to retrieve a value stored in a resource counter, and compare the retrieved value with a predetermined value to determine if the intermediate node has sufficient resources available to establish the session, and wherein the processor is further configured to reject PDUs received at the network interface if the node has insufficient resources available.

22. The node according to claim 21, wherein the processor is a route processor in the intermediate node.

23. The node according to claim 21, the node further comprising:
a packet buffer configured to store data packets received at the network interface; and
a forwarding engine configured to make forwarding path determinations based on headers associated with the packets stored in the packet buffer.

24. The node according to claim 21, wherein the processor rejects PDUs received at the network interface by dropping the received PDUs.

25. The node according to claim 21, wherein the processor rejects PDUs received at the network interface by generating response PDUs indicating the intermediate node has low available resources.

26. The node according to claim 21, wherein the resource counter is configured to store a number of abstract resource units allocated by the intermediate node.

27. The node according to claim 26, wherein the resource counter is configured to increment when a new session is established with the intermediate node and periodically decrement by an amount stored in an associated timing wheel.

28. The node according to claim 21, wherein the session establishment protocol is Point-to-Point Protocol over Ethernet (PPPoE).

29. The node according to claim 28, wherein the PDU is a PPPoE Active Discovery Initiation (PADI) packet.

30. The node according to claim 28, wherein the PDU is a PPPoE Active Discovery Request (PADR) packet.

31. The node according to claim 21, wherein the session establishment protocol is Layer-2 Tunnel Protocol (L2TP).

32. The node according to claim 31, wherein the PDU is an Incoming Call Request (ICRQ) packet.

33. An intermediate network node that implements call admission control, the node comprising:
a network interface configured to receive one or more protocol data units (PDUs) associated with a session establishment protocol;
a memory configured to store the one or more PDUs received at the network interface; and
a processor configured to calculate a partial load metric for one or more resources in the intermediate node, mathematically combine the calculated partial load metrics to generate an overall load metric, and compare the generated load metric with a predetermined value to determine if the intermediate node has a sufficient resources available to establish the session, and wherein the processor is further configured to reject PDUs received at the network interface if the node has insufficient resources available.

* * * * *